(12) United States Patent
Inagaki et al.

(10) Patent No.: US 11,577,737 B2
(45) Date of Patent: Feb. 14, 2023

(54) HEAT MANAGEMENT DEVICE, SYSTEM, METHOD, AND PROGRAM PRODUCT FOR VEHICLE

(71) Applicant: DENSO CORPORATION, Kariya (JP)

(72) Inventors: Masahiko Inagaki, Kariya (JP); Takahito Itoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 380 days.

(21) Appl. No.: 16/840,939

(22) Filed: Apr. 6, 2020

(65) Prior Publication Data

US 2020/0339136 A1 Oct. 29, 2020

(30) Foreign Application Priority Data

Apr. 26, 2019 (JP) .............................. JP2019-085380

(51) Int. Cl.
| | |
|---|---|
| *B60W 50/00* | (2006.01) |
| *F02D 41/06* | (2006.01) |
| *B60W 10/06* | (2006.01) |
| *B60W 10/30* | (2006.01) |
| *B60H 1/00* | (2006.01) |

(52) U.S. Cl.
CPC ......... *B60W 50/00* (2013.01); *B60H 1/00885* (2013.01); *B60W 10/06* (2013.01); *B60W 10/30* (2013.01); *F02D 41/06* (2013.01); *F01P 2037/02* (2013.01)

(58) Field of Classification Search
None
See application file for complete search history.

(56) References Cited

U.S. PATENT DOCUMENTS

| | | |
|---|---|---|
| 2012/0037352 A1 | 2/2012 | Osaka et al. |
| 2012/0179329 A1 | 7/2012 | Okamoto et al. |
| 2013/0306302 A1 | 11/2013 | Osaka et al. |
| 2018/0229620 A1 | 8/2018 | Yamanaka |
| 2018/0339574 A1 | 11/2018 | Sugimura et al. |
| 2019/0009643 A1 | 1/2019 | Yano et al. |
| 2020/0238818 A1* | 7/2020 | Takazawa ............... F01P 7/162 |

FOREIGN PATENT DOCUMENTS

| | | | |
|---|---|---|---|
| JP | 2001037009 | * | 2/2001 |
| JP | 2004-268751 A | | 9/2004 |

* cited by examiner

*Primary Examiner* — Christian Chace
*Assistant Examiner* — Scott R Jagolinzer
(74) *Attorney, Agent, or Firm* — Posz Law Group, PLC

(57) ABSTRACT

A heat management device for a vehicle equipped with heat related systems includes an acquisition unit and a flow rate control unit. The acquisition unit is configured to acquire a temperature related value from electronic control devices corresponding to the heat related systems. The temperature related value includes a temperature adjustment related value and/or an upper limit value. The flow rate control unit is configured to control switching devices that switch flow rate of fluid flowing through the heat related systems from a common path in which the fluid can circulate between the heat related systems. The flow rate control unit controls flow rate of the fluid flowing from the common path to the heat related systems by controlling the switching devices in response to the temperature related value acquired by the acquisition unit for a predetermined scene of the vehicle.

16 Claims, 7 Drawing Sheets

HEAT MANAGEMENT DEVICE, SYSTEM, METHOD, AND PROGRAM PRODUCT FOR VEHICLE

CROSS REFERENCE TO RELATED APPLICATION

This application is based on Japanese Patent Application No. 2019-085380 filed on Apr. 26, 2019, the disclosure of which is incorporated herein by reference in its entirety.

TECHNICAL FIELD

The present disclosure relates to a heat management device, system, method, and program product for a vehicle.

BACKGROUND

A vehicle includes plural heat sources. A sum of heat amount supplied from the heat sources is controlled to minimize a fuel amount consumed by the heat sources.

SUMMARY

According to an aspect of the present disclosure, a heat management device for a vehicle equipped with plural heat related systems in which a temperature of an object is controlled by heat exchange with a fluid, includes an acquisition unit and a flow rate control unit. The acquisition unit is configured to acquire a temperature related value from electronic control devices corresponding to the heat related systems. The temperature related value includes a temperature adjustment related value related to a temperature change required in each of the heat related systems and/or an upper limit value related to a temperature allowed in each of the heat related systems. The flow rate control unit is configured to control a switching device that controls a flow rate of the fluid flowing through the heat related systems from a common path in which the fluid can circulate between the heat related systems. The flow rate control unit controls the flow rate of the fluid flowing from the common path to the heat related systems by controlling the switching device in response to the temperature related value for a predetermined scene of the vehicle.

DESCRIPTION OF EMBODIMENTS

Figure 1:
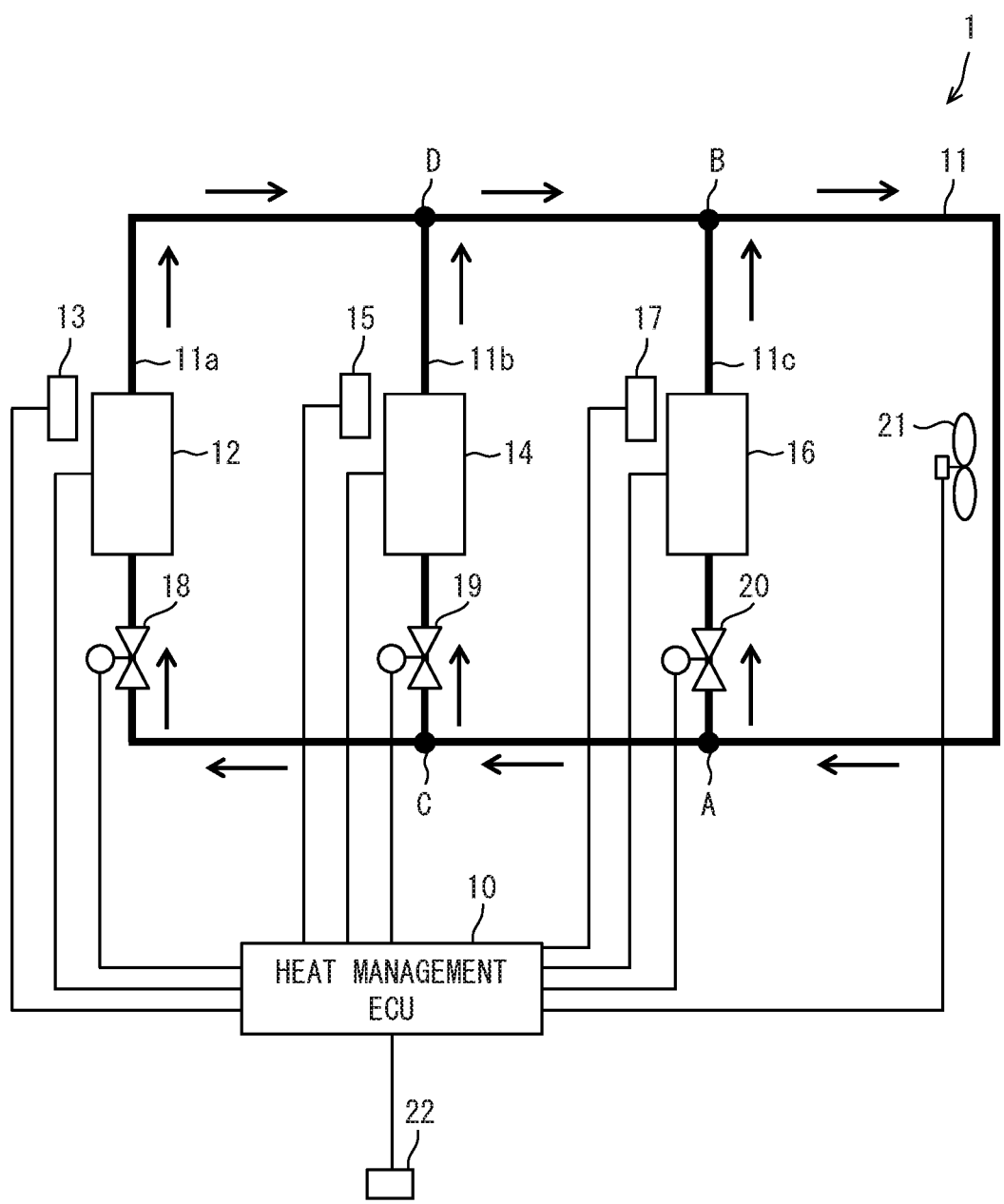
FIG. 1 is a diagram illustrating a schematic configuration of a heat management system according to a first embodiment.

To begin with, examples of relevant techniques will be described.

A vehicle includes plural heat sources such as a cooling water for an internal combustion engine and a heat pump system. An optimization operation is performed so that the total amount of heat supplied from the heat sources matches a required amount of heat, and that the amount of fuel consumed by the heat sources is the minimum. Moreover, the distribution of heat supplied from each of the heat sources is determined.

A vehicle is equipped with plural heat related systems that perform temperature adjustment by heat exchange with a fluid, such as an engine cooling system that cools an internal combustion engine and a heat pump system of an air conditioner.

However, if specific controls, for example, how to raise or lower the temperature of each of the heat sources are not considered in the relevant techniques, the temperatures of the heat related systems mounted on the vehicle cannot be effectively adjusted. For example, in case where it is necessary to increase the temperatures of the heat related systems, if the heating performance is different among the heat related systems, it may not be able to quickly raise the temperature in a heat related system with low heating performance.

The present disclosure provides a vehicle heat management device, a vehicle heat management system, a vehicle heat management method, and a control program to more effectively control the temperatures of the heat related systems mounted on a vehicle.

It should be appreciated that the present disclosure is not limited to the embodiments.

According to an aspect of the present disclosure, a heat management device for a vehicle equipped with plural heat related systems in which a temperature of an object is controlled by heat exchange with a fluid, includes an acquisition unit and a flow rate control unit. The acquisition unit is configured to acquire a temperature related value from electronic control devices corresponding to the heat related systems. The temperature related value includes a temperature adjustment related value related to a temperature change required in each of the heat related systems and/or an upper limit value related to a temperature allowed in each of the heat related systems. The flow rate control unit is configured to control a switching device that controls a flow rate of the fluid flowing through the heat related systems from a common path in which the fluid can circulate between the heat related systems. The flow rate control unit controls the flow rate of the fluid flowing from the common path to the heat related systems by controlling the switching device in response to the temperature related value for a predetermined scene of the vehicle.

According to an aspect of the present disclosure, a heat management system for a vehicle includes:

a plurality of heat related systems in which a temperature of an object is controlled by heat exchange with a fluid;

a plurality of electronic control devices corresponding to the heat related systems and outputting a temperature related value including a temperature adjustment related value related to a temperature change required in each of the heat related systems and/or an upper limit value related to a temperature allowed in each of the heat related systems;

a common path capable of circulating the fluid between the heat related systems;

a switching device configured to control a flow rate of the fluid flowing to the heat related systems from the common path; and a vehicle heat management device having an acquisition unit configured to acquire the temperature related values of the heat related systems from the electronic control devices corresponding to the heat related systems, and a flow rate control unit configured to control the switching device to control the flow rate of the fluid flowing from the common path to the heat related systems in response to the temperature related values for a predetermined scene of the vehicle.

According to an aspect of the present disclosure, a computer-implemented heat management method for a vehicle equipped with plural heat related systems in which a temperature of an object is controlled by heat exchange with a fluid, includes:

acquiring a temperature related value from electronic control units corresponding to the heat related systems, the temperature related value including a temperature adjustment related value related to a temperature change required in each of the heat related systems and/or an upper limit value related to a temperature allowed in each of the heat related systems; and controlling a flow rate of the fluid flowing to the heat related systems from a common path in which the fluid circulates between the heat related systems by controlling a switching device in response to the temperature related value for a predetermined scene of the vehicle.

According to an aspect of the present disclosure, a program product for a vehicle equipped with plural heat related systems in which a temperature of an object is controlled by heat exchange with a fluid, stored on a non-transitory computer readable medium and including instructions for causing a computer to execute:

acquiring a temperature related value from electronic control units corresponding to the heat related systems, the temperature related value including a temperature adjustment related value related to a temperature change required in each of the heat related systems and/or an upper limit value related to a temperature allowed in each of the heat related systems; and controlling a flow rate of the fluid flowing to the heat related systems from a common path in which the fluid circulates between the heat related systems by controlling a switching device in response to the temperature related value for a predetermined scene of the vehicle.

Accordingly, the switching device is controlled to switch the flow rate of the fluid flowing to the heat related systems from the common path that can circulate the fluid between the heat related systems. Therefore, it becomes possible to change the temperatures of the heat related systems in cooperation with the fluid circulating in the common path. In this case, it is possible to heat the common fluid in the heat related systems having heating performance when the temperatures are raised in a coordinated manner. Therefore, when it is necessary to raise the temperatures of the heat related systems, the temperatures can be raised more quickly. Further, heat exchange can be performed between the heat related systems via the common fluid by switching the flow rate of the fluid flowing from the common path to the heat related systems. Therefore, it is also possible to adjust the temperatures of the heat related systems while efficiently using the surplus heat. Since the switching device is controlled in response to the temperature related values of the heat related systems that are acquired for a predetermined scene of the vehicle, the flow rate of the fluid flowing from the common path to the heat related systems can be properly controlled for the predetermined scene. As a result, it becomes possible to more effectively adjust the temperatures of the heat related systems mounted on the vehicle.

Several embodiments for disclosure will be described with reference to the drawings. For convenience of description, the same reference numerals are assigned to portions having the same functions as those illustrated in the drawings used in the description so far among the plurality of embodiments, and a description of the same portions may be omitted. The descriptions of other embodiments may be referred to with respect to these parts given the same reference numerals.

First Embodiment

Schematic Configuration of Heat Management System 1

The present embodiment will now be described with reference to the drawings. A heat management system 1 will be described with reference to FIG. 1. The heat management system 1 is used in a vehicle. In the first embodiment, a vehicle is driven by an internal combustion engine as a driving source. As shown in FIG. 1, the heat management system 1 includes a heat management ECU 10, a bypass pipe 11, an engine cooling system 12, an engine ECU 13, a heat pump (HP) system 14, an air conditioner ECU 15, a brake cooling system 16, a brake ECU 17, a first solenoid valve 18, a second solenoid valve 19, a third solenoid valve 20, a cooling device 21, and a power switch 22. The heat management system 1 corresponds to a vehicle heat management system.

The bypass pipe 11 is a closed circuit through which fluid flows, and is connected with the engine cooling system 12, the heat pump system 14, the brake cooling system 16, the first solenoid valve 18, the second solenoid valve 19, and the third solenoid valve 20. For example, a cooling water may be used as a fluid. The cooling water may be a long life coolant (LLC). The bypass pipe 11 can be rephrased as a water circuit.

The engine cooling system 12 is a mechanism for adjusting the temperature of the engine by exchanging heat with cooling water. Therefore, the engine cooling system 12 corresponds to a heat related system. The engine cooling system 12 controls the temperature of the engine. The engine cooling system 12 has an engine cooling channel in which cooling water for cooling the engine flows out and circulates back to the inside again. The engine cooling channel and the bypass pipe 11 are connected with each other. Accordingly, the cooling water flowing into the engine cooling channel from the bypass pipe 11 circulates to the bypass pipe 11 through the engine cooling channel. As an example, a radiator is provided in the engine cooling channel, and the cooling water is cooled by heat exchange in the radiator. The engine cooling system 12 includes a heating device capable of heating the cooling water. The heating device may be an electric heater, or may use heat of gas exhausted from the engine.

The engine ECU 13 is an electronic control unit that controls the engine and the engine cooling system 12. The engine ECU 13 corresponds to an electronic control unit corresponding to the engine cooling system 12. The engine ECU 13 specifies an engine cooling value that can specify a change in temperature required for cooling water flowing through the engine cooling system 12 for adjusting the temperature of the engine. The engine cooling value may be a heat amount required for the cooling water, a temperature change amount required for the cooling water, or a target temperature of the cooling water. In the present embodiment, a target temperature of the cooling water is used as the engine cooling value.

The engine ECU 13 outputs the engine cooling value to the heat management ECU 10. The engine ECU 13 may also output the upper limit value of the temperature of the cooling water of the engine cooling system 12 (hereinafter referred to as an engine-side upper limit value) and the current water temperature to the heat management ECU 10. The engine-side upper limit value is set for each scene of the vehicle. The engine-side upper limit value may be stored in the nonvolatile memory of the engine ECU 13 in association with each scene of the vehicle in advance. Note that the engine ECU 13 may be configured to sequentially output the current water temperature to the heat management ECU 10. The cooling water temperature of the engine cooling system 12 may be obtained from a water temperature sensor provided in the engine cooling system 12. The water temperature sensor may be configured to detect the temperature of the cooling water after cooling the engine.

The engine ECU 13 may be configured to raise the temperature of the cooling water by operating the above-described heating device capable of heating the cooling water for a predetermined scene of the vehicle, for example, when the engine of the vehicle needs to warm up. Therefore, it can be said that the engine cooling system 12 has a heating performance. In addition, when raising the temperature of the cooling water, the engine ECU 13 may control the cooling water in the engine cooling channel without passing through the radiator. When lowering the temperature of the cooling water, the engine ECU 13 may control the cooling water in the engine cooling channel to pass through the radiator.

The HP system 14 uses heat of outside air to heat the vehicle with an air conditioner for indoor air conditioning. The HP system 14 is a mechanism for adjusting the temperature of the conditioned air by heat exchange with cooling water. Therefore, the HP system 14 also corresponds to a heat related system. The HP system 14 controls the temperature of the conditioned air. The HP system 14 includes a closed circuit (hereinafter, a heating channel) that heats conditioned air using a heat pump cycle. The heating channel and the bypass pipe 11 are connected with each other. The HP system 14 is configured to use the same cooling water as the engine cooling system 12.

The heating channel is connected with a heat absorber, a compressor, a condenser, and a decompressor. In the heat absorber, the fluid absorbs heat by heat exchange with outside air. In the compressor, the fluid absorbed by the heat absorber is compressed to have a high temperature. In the condenser, the air condenses and dissipates heat by warming the conditioned air by heat exchange with the fluid heated by the compressor. In the decompressor, the fluid condensed and radiated by the condenser is depressurized to further lower the temperature of the fluid. The temperature of fluid is lowered by the decompressor, and the fluid absorbs heat by the heat absorber. As an example, the HP system 14 may be connected to the bypass pipe 11 at a path from the compressor to the condenser in the heating channel. Accordingly, the cooling water flowing from the bypass pipe 11 into the heating channel circulates through the heating channel to the bypass pipe 11 through the condenser, the decompressor, the heat absorber, and the compressor in this order.

The air conditioner may perform a cooling operation by using a refrigeration cycle circuit that cools air using a refrigerant vapor compression refrigeration cycle.

The air conditioner ECU 15 is an electronic control unit that controls the air conditioner and the HP system 14. The air conditioner ECU 15 corresponds to an electronic control device corresponding to the HP system 14. The air conditioner ECU 15 calculates a heating value that can specify a temperature change required for the cooling water flowing through the HP system 14 for a heating operation by the air conditioner. The heating value may be a heat amount required for the cooling water, a temperature change amount required for the cooling water, or a target temperature of the cooling water. In the present embodiment, the target temperature of the cooling water is used as the heating value.

The air conditioner ECU 15 outputs the heating value to the heat management ECU 10. The air conditioner ECU 15 may also output the upper limit value of the temperature of the cooling water of the HP system 14 (hereinafter, the air-conditioner-side upper limit value) and the current water temperature to the heat management ECU 10. The air-conditioner-side upper limit value is set for each scene of the vehicle. The air-conditioner-side upper limit value may be stored in the nonvolatile memory of the air conditioner ECU 15 in association with each scene of the vehicle in advance. The air conditioner ECU 15 may be configured to sequentially output the current water temperature to the heat management ECU 10. The cooling water temperature of the HP system 14 may be obtained from a water temperature sensor provided in the HP system 14. The water temperature sensor may be configured to detect the temperature of the cooling water in a path from the compressor to the condenser in the heating channel.

The air conditioner ECU 15 operates the heat pump cycle of the HP system 14 to heat the cooling water with the heat absorber and the compressor to raise the temperature of the cooling water for a predetermined scene of the vehicle, for example, when starting the vehicle in which the engine needs to be warmed up. Therefore, it can be said that the HP system 14 has a heating performance. When the temperature of the cooling water of the HP system 14 satisfies the target temperature, the air conditioner ECU 15 does not operate the heat pump cycle of the HP system 14 and maintains the water temperature by the cooling water flowing from the bypass pipe 11.

The brake cooling system 16 is a mechanism for adjusting the temperature of the brake by heat exchange with cooling water. Therefore, the brake cooling system 16 also corresponds to a heat related system. The brake cooling system 16 controls the temperature of the brake. The brake cooled by the brake cooling system 16 may be a brake pad of a disc brake or a brake fluid. In the brake cooling system 16, a brake cooling channel is formed for cooling water that cools the brake, and the cooling water flows to the outside and circulates again to the inside. The brake cooling channel and the bypass pipe 11 are connected with each other. Accordingly, the cooling water flowing into the brake cooling channel from the bypass pipe 11 circulates to the bypass pipe 11 through the brake cooling channel.

The brake ECU 17 is an electronic control device that controls the brake and the brake cooling system 16. The brake ECU 17 corresponds to an electronic control device corresponding to the brake cooling system 16. The brake ECU 17 calculates a brake cooling value that can specify a temperature change required for the cooling water flowing through the brake cooling system 16 for adjusting the temperature of the brake. The brake cooling value may be an amount of heat required for the cooling water, a temperature change amount required for the cooling water, or a target temperature of the cooling water. In the present embodiment, a target temperature of the cooling water is used as the brake cooling value.

The brake ECU 17 outputs the brake cooling value to the heat management ECU 10. The brake ECU 17 may also output the brake-side upper limit value of the cooling water temperature of the brake cooling system 16 and the current cooling temperature to the heat management ECU 10. The brake-side upper limit value is set for each scene of the vehicle, and may be stored in the nonvolatile memory of the brake ECU 17 in association with each scene of the vehicle in advance. Note that the brake ECU 17 may be configured to sequentially output the current water temperature to the heat management ECU 10. The temperature of the cooling water of the brake cooling system 16 may be obtained from a water temperature sensor provided in the brake cooling system 16. The water temperature sensor may be configured to detect the temperature of the cooling water after cooling the brake.

As described above, the engine cooling system 12, the HP system 14, and the brake cooling system 16 use and share the bypass pipe 11 as a common path. An example of the path of the bypass pipe 11 will be described with reference to FIG. 1. The arrows in FIG. 1 indicate the flow direction of the cooling water flowing in the bypass pipe 11. As shown in FIG. 1, the bypass pipe 11 branches into a path 11a, a path 11b, and a path 11c. The path 11c is branched at the branch point A of the bypass pipe 11, relative to the paths 11a and 11b, and merges at the junction point B. The path 11b is branched at a branch point C of the bypass pipe 11, relative to the path 11a, and merges at the junction point D.

The engine cooling system 12 is provided on the path 11a. The HP system 14 is provided on the path 11b. The brake cooling system 16 is provided on the path 11c. Note that FIG. 1 is merely an example, and the engine cooling system 12, the HP system 14, and the brake cooling system 16 may be distributed to any of the paths 11a, 11b, and 11c respectively.

The first solenoid valve 18, the second solenoid valve 19, and the third solenoid valve 20 are electromagnetic valves capable of electrically controlling the throttle state. The operations of the first solenoid valve 18, the second solenoid valve 19, and the third solenoid valve 20 are controlled by the heat management ECU 10. In the present embodiment, the first solenoid valve 18, the second solenoid valve 19, and the third solenoid valve 20 control the open degree in a stepwise manner under the control of the heat management ECU 10, so that the flow rate of the inflowing cooling water can be changed stepwise. The first solenoid valve 18, the second solenoid valve 19, and the third solenoid valve 20 reduce the flow rate of the cooling water by reducing the open degree. The first solenoid valve 18, the second solenoid valve 19, and the third solenoid valve 20 increase the flow rate of the cooling water by opening the valve.

The first solenoid valve 18 is provided between the branch point C of the path 11a and the engine cooling system 12. The flow rate of the cooling water flowing from the bypass pipe 11 into the engine cooling system 12 can be reduced by narrowing the open degree of the first solenoid valve 18. On the other hand, by opening the first solenoid valve 18, the flow rate of the cooling water flowing from the bypass pipe 11 into the engine cooling system 12 can be increased. The first solenoid valve 18 corresponds to a switching device.

The second solenoid valve 19 is provided between the branch point C of the path 11b and the HP system 14. The flow rate of the cooling water flowing into the HP system 14 from the bypass pipe 11 can be reduced by narrowing the open degree of the second solenoid valve 19. On the other hand, by opening the second solenoid valve 19, the flow rate of the cooling water flowing from the bypass pipe 11 into the HP system 14 can be increased. The second solenoid valve 19 also corresponds to a switching device.

The third solenoid valve 20 is provided between the branch point A of the path 11c and the brake cooling system 16. The flow rate of the cooling water flowing from the bypass pipe 11 into the brake cooling system 16 can be reduced by narrowing the open degree of the third solenoid valve 20. On the other hand, by opening the third solenoid valve 20, the flow rate of the cooling water flowing into the brake cooling system 16 from the bypass pipe 11 can be increased. The third solenoid valve 20 also corresponds to a switching device.

The cooling device 21 cools the cooling water circulating in the bypass pipe 11. The cooling device 21 operates under the control of the heat management ECU 10. As an example, a radiator that dissipates heat of the cooling water by providing heat exchange between air blown by a fan and the cooling water may be used as the cooling device 21.

The power switch 22 is a switch for starting the engine of the vehicle. In case where a vehicle is driven by a motor as a driving source, the switch is used to start the motor generator.

The heat management ECU 10 includes, for example, a processor, a memory, an I/O, and a bus connecting them. The heat management ECU 10 is an electronic control unit that executes processing related to heat management in the heat management system 1 (hereinafter, management related processing) by executing a control program stored in the memory. The heat management ECU 10 corresponds to a vehicle heat management device. Further, the computer executes steps of the management related processing to execute the vehicle heat management method. The memory as used herein is a non-transitory tangible storage medium that stores a computer-readable program and data non-temporarily. The non-transitory tangible storage medium is realized by a semiconductor memory, a magnetic disc, or the like. The details of the heat management ECU 10 will be described below.

Schematic Configuration of Heat Management ECU 10

Figure 2:
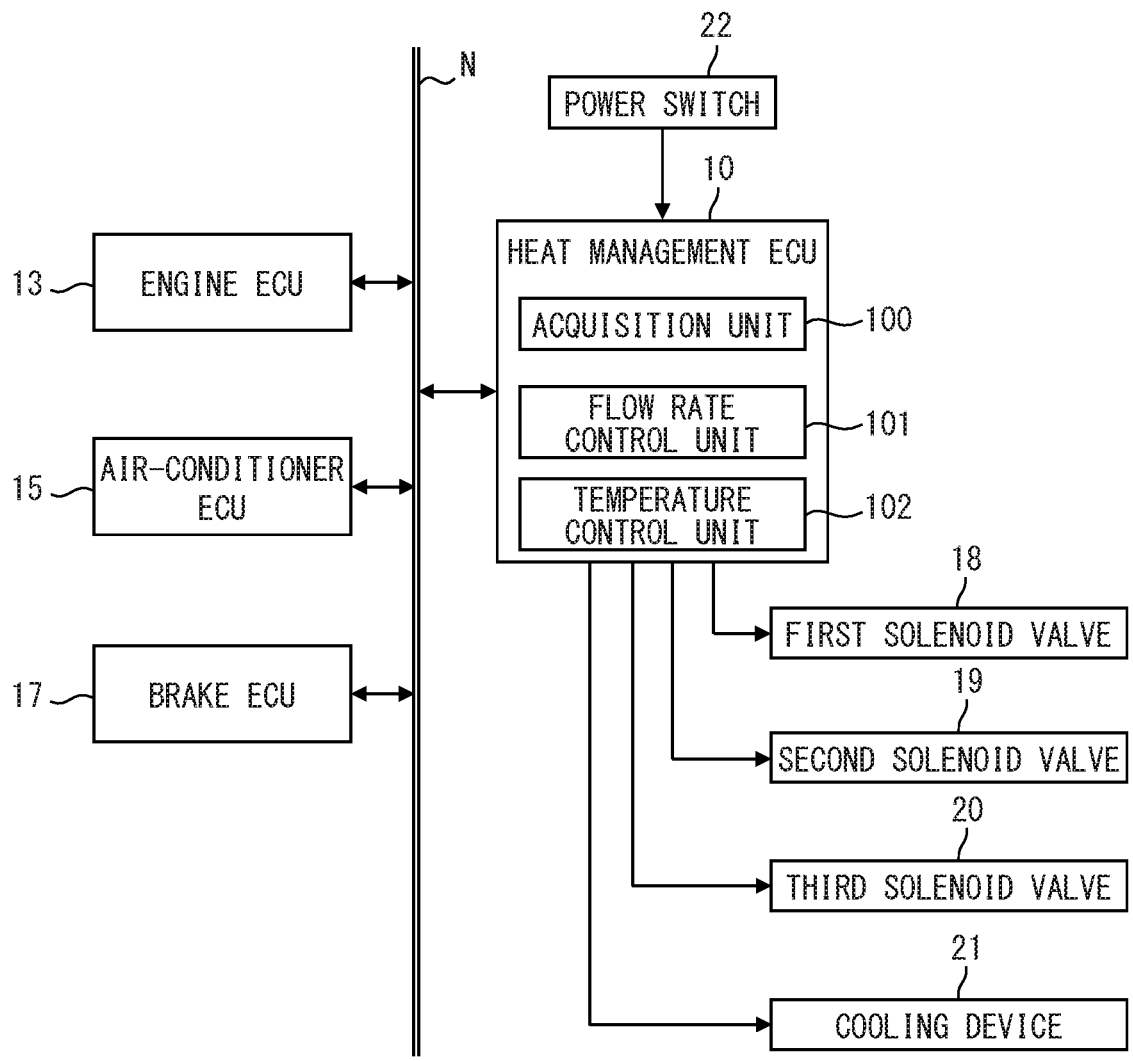
FIG. 2 is a diagram illustrating a schematic configuration of a heat management ECU of the first embodiment.

A schematic configuration of the heat management ECU 10 will be described with reference to FIG. 2. The heat management ECU 10 is connected to the engine ECU 13, the air conditioner ECU 15, and the brake ECU 17 via a vehicle-mounted network N. The heat management ECU 10 is connected to the first solenoid valve 18, the second solenoid valve 19, the third solenoid valve 20, the cooling device 21, and the power switch 22 via signal lines.

The heat management ECU 10 includes an acquisition unit 100, a flow rate control unit 101, and a temperature control unit 102 as functional blocks. A part or all of the functions executed by the heat management ECU 10 may be configured in hardware by one or plural ICs. In addition, some or all of the functional blocks included in the heat management ECU 10 may be realized by a combination of execution of software by a processor and hardware members.

The acquisition unit 100 acquires an engine cooling value, an engine-side upper limit value, and a water temperature of the engine cooling system 12 output from the engine ECU 13 for each scene of the vehicle. The acquisition unit 100 acquires the heating value, the air-conditioner-side upper limit value, and the water temperature of the HP system 14 output from the air conditioner ECU 15 for each scene of the vehicle. The acquisition unit 100 acquires a brake cooling value, a brake-side upper limit value, and a water temperature of the brake cooling system 16 output from the brake ECU 17 for each scene of the vehicle. When the engine cooling value, the heating value, and the brake cooling value are not distinguished from each other, they are called temperature adjustment related values. When the engine-side upper limit value, the air-conditioner-side upper limit value, and the brake-side upper limit value are not distinguished from each other, they are referred to as upper limit values. The temperature adjustment related value and the upper limit value are collectively called a temperature related value.

The flow rate control unit 101 switches the throttle state of the first solenoid valve 18, the second solenoid valve 19, and the third solenoid valve 20. As an example, the flow rate control unit 101 sets all of the first solenoid valve 18, the second solenoid valve 19, and the third solenoid valve 20 to the fully open state by default. Therefore, before the vehicle is started with the power switch 22, the flow of the cooling water flowing from the bypass pipe 11 is not limited in the engine cooling system 12, the HP system 14, and the brake cooling system 16. When the engine cooling system 12, the HP system 14, and the brake cooling system 16 are not distinguished from each other, they are referred to as heat related systems.

The flow rate control unit 101 controls the first solenoid valve 18, the second solenoid valve 19, and the third solenoid valve 20 in response to the temperature related value acquired by the acquisition unit 100 for each scene of the vehicle. Details of the control by the flow rate control unit 101 for each scene of the vehicle will be described later.

The temperature control unit 102 performs heating and cooling of the cooling water circulating in the bypass pipe 11. The temperature control unit 102 cools the cooling water by operating the cooling device 21. The temperature control unit 102 instructs the engine ECU 13 to operate the heating device in the engine cooling system 12 to heat the cooling water. The temperature control unit 102 instructs the air conditioner ECU 15 to operate the heat pump cycle of the HP system 14 to heat the cooling water.

Heat Management Related Processing in Heat Management ECU 10

Figure 3:
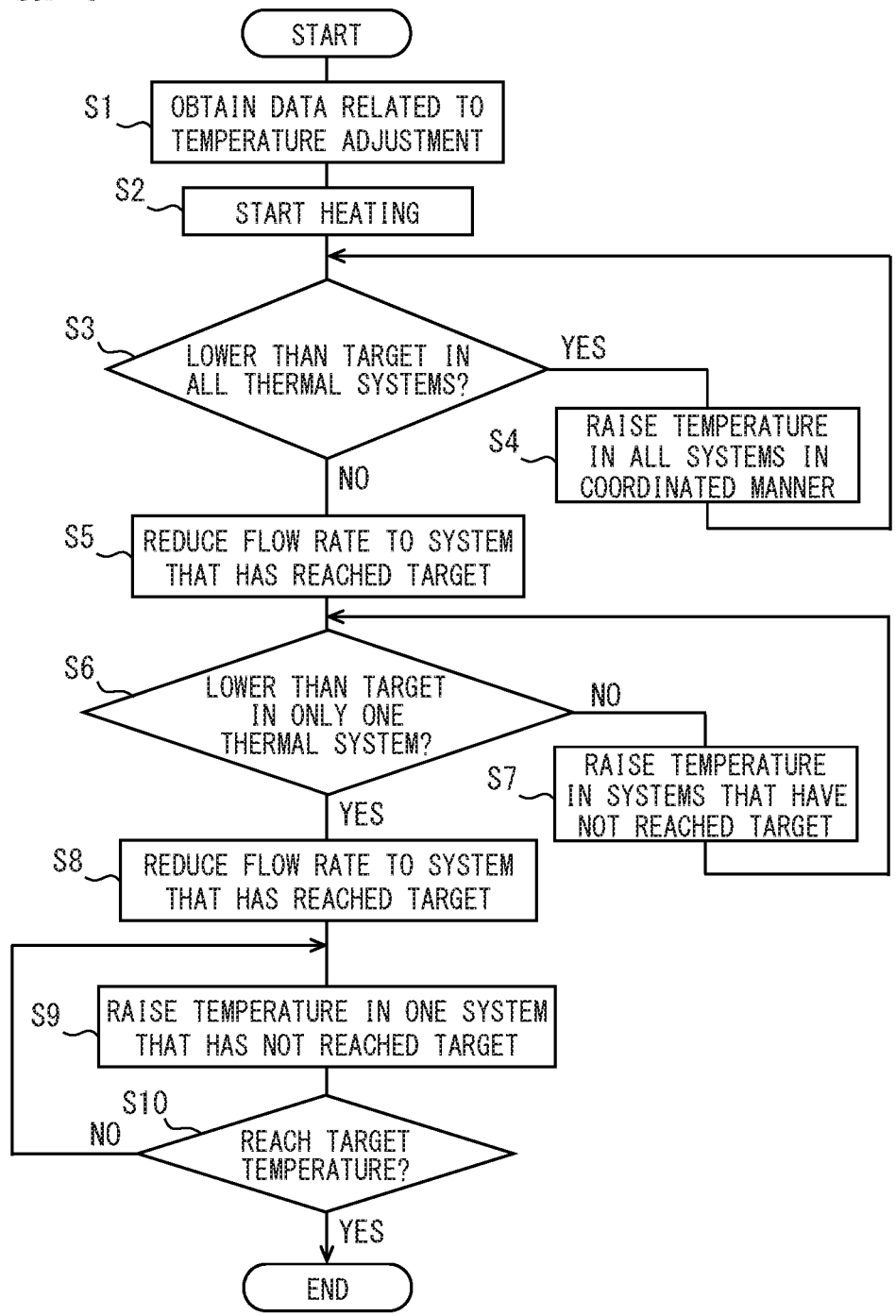
FIG. 3 is a flowchart illustrating a flow of a heat management related process at the time of starting a vehicle in the heat management ECU.
Figure 4:
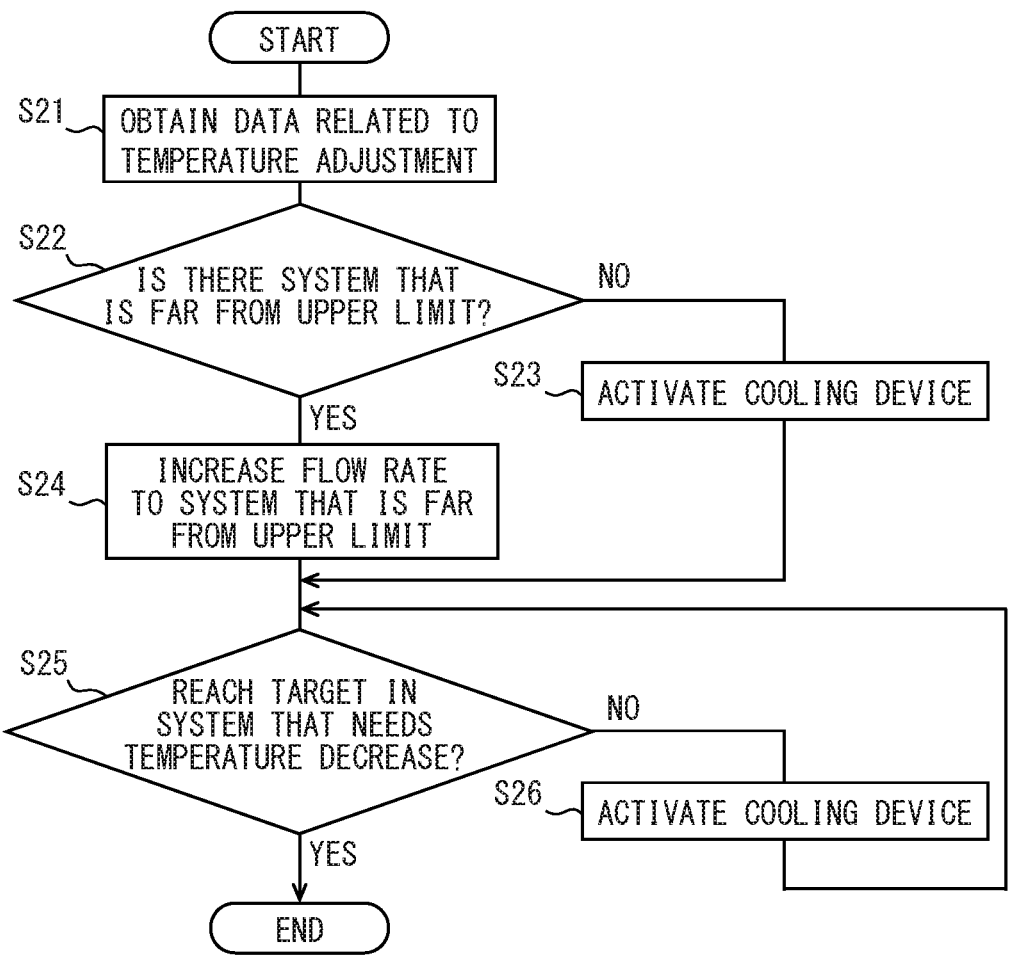
FIG. 4 is a flowchart illustrating a flow of a heat management related process, after the vehicle is started, in the heat management ECU.

A flow of the heat management related processing in the heat management ECU 10 will be described with reference to the flowcharts of FIGS. 3 and 4. First, a flow of the heat management related processing at the time of starting the vehicle will be described with reference to the flowchart in FIG. 3. The flowchart in FIG. 4 may start when the power switch 22 is turned on. The heat management ECU 10 may determine that the vehicle is starting when the signal of the power switch 22 has been turned on. In FIG. 4, the acquisition unit 100 may sequentially acquire the water temperature of each heat related system.

In step S1, the acquisition unit 100 acquires temperature adjustment related values, upper limit values, and water temperatures of the heat related system output from the engine ECU 13, the air conditioner ECU 15, and the brake ECU 17 respectively.

In step S2, the temperature control unit 102 starts heating the cooling water circulating in the bypass pipe 11. For example, the heating device provided in the engine cooling system 12 and the heat pump cycle of the HP system 14 are operated to heat the cooling water. That is, the cooling water is heated using the heating performance of the heat related system such as the engine cooling system 12 and the HP system 14. Since the brake cooling system 16 does not have heating performance, heating by the brake cooling system 16 is not performed.

In step S3, the flow rate control unit 101 determines whether or not the water temperature has not reached the target temperature in all the heat related systems based on the temperature adjustment related values and the sequentially acquired water temperatures acquired in S1. In the present embodiment, the temperature adjustment related value of each heat related system acquired in S1 is used as the target temperature required for each heat related system. For example, if the water temperature is 10° C. and the temperature adjustment related value is 50° C., the target temperature can be calculated as 60° C. In case where the temperature adjustment related value is a temperature change amount required by the cooling water, the target temperature may be calculated from the water temperature of each heat related system acquired in S1 and the temperature change amount. In case where the temperature adjustment related value is the amount of heat required by the cooling water, the amount of temperature change required by the cooling water is calculated from the amount of heat. Then, the target temperature may be calculated from the water temperature of each heat related system acquired in S1 and the temperature change amount.

In step S3, when the temperature is lower than the target temperature in all the heat related systems (YES in S3), the process proceeds to step S4. When there is a heat related system in which the temperature has reached the target temperature (NO in S3), the process proceeds to step S5. In FIG. 3, the following description will be made on the assumption that the target temperature of the engine cooling system 12 is 100° C., the target temperature of the HP system 14 is 60° C., and the target temperature of the brake cooling system 16 is 30° C.

In step S4, the flow rate control unit 101 raises the temperature of all the heat related systems in a coordinated manner, and returns to S3 to repeat the processing. Specifically, the flow rate control unit 101 brings all of the first solenoid valve 18, the second solenoid valve 19, and the third solenoid valve 20 into a fully open state. When all of the first solenoid valve 18, the second solenoid valve 19, and the third solenoid valve 20 are fully opened, the flow rate of the cooling water to all the heat related systems is not limited. Therefore, the cooling water warmed by the heating started in S2 circulates through all the heat related systems without limiting the flow rate. Therefore, all the heat related systems are cooperatively heated by the heated cooling water. In the present embodiment, until the water temperature of each heat related system reaches 30° C., the flow rate control unit 101 opens all of the first solenoid valve 18, the second solenoid valve 19, and the third solenoid valve 20 in a fully open state. Then, all the heat related systems are coordinated to raise the temperature.

In step S5, the flow rate control unit 101 reduces the flow rate of the cooling water to the heat related system in which the temperature has reached the target temperature. In the present embodiment, when the temperature of the cooling water circulating in the bypass pipe 11 rises due to the start of heating in S2, the water temperature of the brake cooling system 16 first reaches the target temperature of 30° C. Therefore, the flow rate control unit 101 reduces the flow rate of the cooling water flowing from the bypass pipe 11 into the brake cooling system 16 by narrowing the open degree of the third solenoid valve 20. By reducing the flow rate of the cooling water flowing into the brake cooling system 16, it is possible to prevent the water temperature of the brake cooling system 16 from continuing to rise above the target temperature. In addition, since the flow of the cooling water from the bypass pipe 11 to the brake cooling system 16 is not stopped while the flow rate is reduced, the target temperature of the cooling water can be maintained in the brake cooling system 16 without heating the cooling water.

In step S6, the flow rate control unit 101 determines whether or not the water temperature has reached the target temperature while leaving one heat related system, based on the temperature adjustment related values acquired in S1 and the sequentially acquired water temperatures. When the water temperature is lower than the target temperature in only one heat related system (YES in S6), the process proceeds to step S8. When there are plural heat related systems in which the water temperature has not reached the target temperature (NO in S6), the process proceeds to step S7. In the present embodiment, when the water temperature of the HP system 14 has not reached the target temperature of 60° C., the two heat related systems in which the temperature has not reached the target temperature are the engine cooling system 12 and the HP system 14. When the water temperature of the HP system 14 has reached the target temperature of 60° C., the heat related system in which the temperature has not reached the target temperature becomes one, i.e., the engine cooling system 12.

In step S7, the flow rate control unit 101 raises the temperatures of plural heat related systems in which the temperature has not reached the target temperature in a coordinated manner, and returns to S6 to repeat the processing. Specifically, the flow rate control unit 101 does not reduce the open degree of the first solenoid valve 18 and the second solenoid valve 19, so that the flow rate of the cooling water flowing from the bypass line 11 into the engine cooling system 12 and the HP system 14 does not decrease. Therefore, the temperatures of the engine cooling system 12 and the HP system 14 are raised in cooperation with the cooling water heated by the heating started in S2. That is, the plural heat related systems in which the temperature has not reached the target temperature are cooperatively heated.

In step S8, the flow rate control unit 101 reduces the flow rate of the cooling water to the heat related system in which the temperature has reached the target temperature. In the present embodiment, after the water temperature of the brake cooling system 16 reaches the target temperature of 30° C., the water temperature of the HP system 14 reaches the target temperature of 60° C. Therefore, the flow rate control unit 101 reduces the flow rate of the cooling water flowing into the HP system 14 from the bypass pipe 11 by narrowing the open degree of the second solenoid valve 19. By reducing the flow rate of the cooling water flowing into the HP system 14, it is possible to prevent the water temperature of the HP system 14 from continuing to rise above the target temperature. In addition, since the flow of the cooling water from the bypass pipe 11 into the HP system 14 is not stopped while the flow rate is reduced, the target temperature of the cooling water can be maintained in the HP system 14 without heating the cooling water. Therefore, in S8, the temperature control unit 102 may stop heating the cooling water by stopping the heat pump cycle of the HP system 14.

In step S9, the flow rate control unit 101 raises the temperature of one heat related system that has not reached the target temperature. Specifically, the flow rate control unit 101 does not reduce the flow rate of the cooling water flowing into the engine cooling system 12 from the bypass pipe 11 by closing the first solenoid valve 18. Therefore, the temperature of the engine cooling system 12 is raised by the cooling water warmed by the heating started in S2. That is, the temperature of the remaining one heat related system that has not reached the target temperature is raised.

In step S10, the flow rate control unit 101 determines whether or not the water temperature of the remaining one heat related system has reached the target temperature based on the temperature adjustment related values acquired in S1 and the sequentially acquired water temperatures. Then, when the water temperature of the remaining one heat related system has reached the target temperature (YES in S10), the heat management related processing ends. On the other hand, if the water temperature of the remaining one heat related system has not reached the target temperature (NO in S10), the process returns to S9 and repeats the processing.

Next, a flow of the heat management related processing in case where a part of the heat related system requires cooling after the vehicle is started will be described with reference to the flowchart of FIG. 4. The flowchart of FIG. 4 may be started when a part of the plural heat related systems needs to be cooled. The heat management ECU 10 may determine that the cooling of the heat related system is required when the sequentially acquired water temperature has exceeded the upper limit value acquired by the acquisition unit 100. In FIG. 4, it is assumed that the water temperature of each heat related system is sequentially obtained by the acquisition unit 100.

In step S21, the acquisition unit 100 acquires temperature adjustment related values, upper limit values, and water temperatures of the heat related systems respectively output from the engine ECU 13, the air conditioner ECU 15, and the brake ECU 17. The temperature adjustment related value and the upper limit value for each heat related system may be changed according to the status of the vehicle. If the temperature adjustment related value and the upper limit value of each heat related system are not changed according to the status of the vehicle, S21 may be omitted.

In step S22, it is determined whether or not there is a heat related system having a temperature margin with respect to the upper limit value based on the upper limit value acquired in S21 and the sequentially acquired water temperature (that is, the current water temperature). For example, a heat related system in which a value obtained by subtracting the current water temperature from the upper limit value is a positive value equal to or greater than a threshold value may be determined as a heat related system having a temperature margin with respect to the upper limit value. The threshold value may be suitably set to be larger than 0. In the case where S21 is omitted, processing may be performed using the upper limit value acquired by the acquisition unit 100 at the time of starting the vehicle in S22.

In step S22, if there is a heat related system in which the temperature is far from the upper limit (YES in S22), the process proceeds to step S24. On the other hand, if there is no heat related system in which the temperature is far from the upper limit (NO in S22), the process proceeds to step S23. In FIG. 4, as an example, the following description will be made on the assumption that the upper limit of the engine cooling system 12 is 100° C., the upper limit of the HP system 14 is 80° C., and the upper limit of the brake cooling system 16 is 150° C.

For example, in case where the water temperature of the brake cooling system 16 exceeds the upper limit and the process of the flowchart in FIG. 4 is started, when the water temperature of either the engine cooling system 12 or the HP system 14 has a temperature margin with respect to the upper limit, the process proceeds to S24. On the other hand, if there is no system in which the water temperatures of the engine cooling system 12 and the HP system 14 are far from the upper limit, the process proceeds to S23. The water temperature of the brake cooling system 16 may exceed the upper limit value, for example, when the vehicle is continuously braked by the disc brake for a long time.

Further, the process of the flowchart of FIG. 4 may be started when the water temperature of the engine cooling system 12 exceeds the upper limit. In this case, if the water temperature of any one of the HP system 14 and the brake cooling system 16 has a temperature margin with respect to the upper limit, the process proceeds to S24. On the other hand, if there is no margin for the water temperature of each of the HP system 14 and the brake cooling system 16 with respect to the upper limit, the process proceeds to S23. The water temperature of the engine cooling system 12 may exceed the upper limit, for example, when a large load is continuously applied to the engine.

In step S23, the temperature control unit 102 activates the cooling device 21, and proceeds to step S25. When the cooling device 21 is operated, the cooling water circulating through the bypass pipe 11 is cooled by the cooling device 21. In S23, the flow rate control unit 101 increases the flow rate of the cooling water to the heat related system in which the water temperature has exceeded the upper limit, thereby cooling the heat related system by the cooling water cooled by the cooling device 21. For example, when the water temperature exceeds the upper limit in the brake cooling system 16, the flow rate control unit 101 may open the third solenoid valve 20 fully. For a heat related system that does not need cooling, the flow rate may be kept reduced.

In step S24, the flow rate control unit 101 increases the flow rate of the cooling water to the heat related system where the water temperature has a margin with respect to the upper limit value. For example, if cooling of the brake cooling system 16 is necessary to lower the temperature, and if the water temperatures of both the engine cooling system 12 and the HP system 14 have margin for the upper limit, it is preferable to increase the flow rate of the cooling water to both of the engine cooling system 12 and the HP system 14. More specifically, the flow rate control unit 101 may set the first solenoid valve 18 and the second solenoid valve 19 to the fully opened state, because cooling water can be cooled more quickly as the number of heat related systems used for cooling increases.

If the temperature of the engine cooling system 12 needs to be lowered and only the water temperature of the HP system 14 has a margin with respect to the upper limit, of the HP system 14 and the brake cooling system 16, it is preferable to increase the flow rate of the cooling water to the HP system 14. In this case, the flow rate of the cooling water to the brake cooling system 16 is not changed.

In step S25, the flow rate control unit 101 determines whether or not the water temperature of the heat related system that needs to be cooled has reached the target temperature, based on the temperature adjustment related values acquired in S21 and the sequentially acquired water temperatures. If the temperature has been reached the target temperature (YES in S25), the heat management related processing is terminated. On the other hand, if the temperature has not reached the target temperature (NO in S25), the process proceeds to step S26. In the case where S21 is omitted, the process may be performed using the temperature adjustment related value acquired by the acquisition unit 100 at the time of starting the vehicle in S25.

In step S26, the temperature control unit 102 activates the cooling device 21, and returns to S25 to repeat the processing. In other words, when the water temperature can be lowered to the target temperature by cooling by heat exchange between the heat related system having a margin with respect to the upper limit value and the heat related system requiring the temperature lowering, the heat management related processing ends without operating the cooling device 21. If the temperature cannot be lowered to the target temperature by the cooling by the heat exchange, the cooling device 21 is operated to lower the temperature to the target temperature, and the heat management related processing ends.

The flow rate control unit 101 is not restricted to switch the flow rate of the cooling water flowing to the heat related system in the above-described case. The flow rate control unit 101 switches the flow rate of the cooling water flowing to the heat related system in various vehicle scenes, for example, when the water temperatures of the plural heat related systems need to be raised. Alternatively, when the water temperature of the heat related system needs to be lowered, the present embodiment may be applied to.

According to the first embodiment, the flow rate control unit 101 controls the first solenoid valve 18, the second solenoid valve 19, and the third solenoid valve 20 corresponding to a switching device that switches the flow rate of the cooling water flowing from the bypass pipe 11 to the plural heat related systems such as the engine cooling system 12, the HP system 14, and the brake cooling system 16. Therefore, the temperature can be changed in a coordinated manner for the plural heat related systems, by the cooling water circulating in the bypass pipe 11, which is a common path.

In case where there are plural heat related systems having heating performance, when the temperature can be changed in a coordinated manner by the cooling water circulating in the bypass pipe 11, the cooling water that is common among the plural heat related systems can be heated. Therefore, when it is necessary to raise the temperatures of the heat related systems, the temperature can be raised more quickly.

Further, heat exchange can be performed through the common cooling water between a heat related system whose temperature is to be lowered and a heat related system having a margin for the upper limit value, by controlling the flow rate of the cooling water flowing from the bypass pipe 11 to the heat related systems. Therefore, it is possible to adjust the temperature of the heat related system while efficiently using the excess heat generated in the heat related system for a heat related system having a temperature margin with respect to the upper limit. The first solenoid valve 18, the second solenoid valve 19, and the third solenoid valve 20 are controlled based on the temperature adjustment related values of the plural heat related systems acquired by the acquisition unit 100 for each scene of the vehicle. Therefore, the above-described controlling can be properly used for each scene of the vehicle. As a result, it becomes possible to more effectively adjust the temperatures of the plural heat related systems mounted on the vehicle.

According to the first embodiment, the flow rate of the cooling water flowing from the bypass pipe 11 to the heat related system is reduced without stopping the flow but maintaining the flow. That is, the plural heat related systems are not independent cooling circuits but are common cooling circuits. Therefore, in the heat related system in which the flow rate of the cooling water from the bypass pipe 11 is reduced, it is possible to keep the target temperature of the cooling water without heating the cooling water while suppressing the temperature rise.

Second Embodiment

In the first embodiment, the vehicle is driven by an internal combustion engine as a traveling drive source. However, the present disclosure is not necessarily limited to this. In a second embodiment, a hybrid vehicle is driven by using both an internal combustion engine and a motor as a traveling drive source. The configuration of the second embodiment will be described below.

Schematic Configuration of Heat Management System 1a

Figure 5:
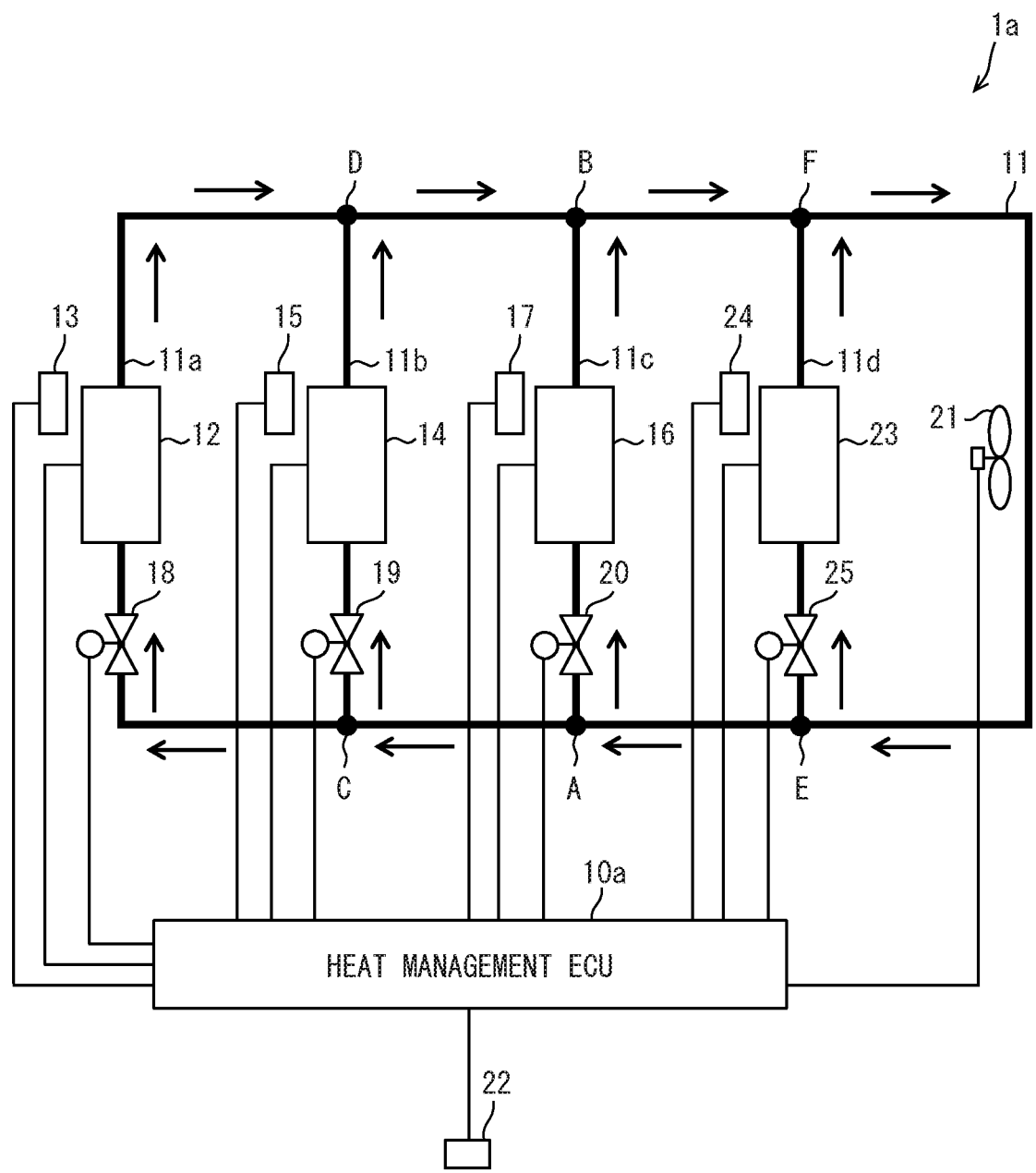
FIG. 5 is a diagram illustrating a schematic configuration of a heat management system according to a second embodiment.

A heat management system 1a according to the second embodiment will be described with reference to FIG. 5. The heat management system 1a includes a heat management ECU 10a, a bypass pipe 11, an engine cooling system 12, an engine ECU 13, an HP system 14, an air conditioner ECU 15, a brake cooling system 16, a brake ECU 17, a first solenoid valve 18, a second solenoid valve 19, a third solenoid valve 20, a cooling device 21, a power switch 22, an inverter cooling system 23, a motor ECU 24, and a fourth solenoid valve 25. The heat management system 1a with the heat management ECU 10a, the inverter cooling system 23, the motor ECU 24, and the fourth solenoid valve 25 is different from the heat management system 1 of the first embodiment with the heat management ECU 10. The other configuration of the heat management system 1a is the same as the heat management system 1. The heat management system 1a also corresponds to a vehicle heat management system.

The inverter cooling system 23 is a mechanism that adjusts the temperature of an inverter that controls the rotation speed of a motor used as a traveling drive source of the vehicle by exchanging heat with cooling water. Therefore, the inverter cooling system 23 also corresponds to a heat related system. The inverter cooling system 23 controls the temperature of the inverter.

The inverter cooling system 23 has an inverter cooling channel in which cooling water for cooling the inverter flows to the outside and circulates again to the inside. The inverter cooling channel and the bypass pipe 11 are connected with each other. Accordingly, the cooling water flowing into the inverter cooling channel from the bypass pipe 11 circulates to the bypass pipe 11 through the inverter cooling channel. As an example, a radiator is provided in the inverter cooling channel, and the cooling water is cooled by heat exchange in the radiator.

The motor ECU 24 is an electronic control unit that controls the inverter and the inverter cooling system 23. The motor ECU 24 corresponds to an electronic control unit corresponding to the inverter cooling system 23. The motor ECU 24 specifies an inverter cooling value that defines a change in temperature required for cooling water flowing through the inverter cooling system 23 for adjusting the temperature of the inverter. The inverter cooling value may be a heat amount required for the cooling water, a temperature change amount required for the cooling water, or a target temperature of the cooling water. In the present embodiment, a target temperature of the cooling water is used as the inverter cooling value.

The motor ECU 24 outputs the inverter cooling value to the heat management ECU 10a. The motor ECU 24 may also output an inverter-side upper limit value of the temperature of the cooling water of the inverter cooling system 23 and the current water temperature to the heat management ECU 10a. The inverter-side upper limit value is set for each scene of the vehicle. The inverter-side upper limit value may be stored in the nonvolatile memory of the motor ECU 24 in association with a predetermined scene of the vehicle in advance. The motor ECU 24 may be configured to sequentially output the current water temperature to the heat management ECU 10a. The temperature of the cooling water in the inverter cooling system 23 may be obtained from a water temperature sensor provided in the inverter cooling system 23. The water temperature sensor may be configured to detect the temperature of the cooling water after cooling the inverter.

The engine cooling system 12, the HP system 14, the brake cooling system 16, and the inverter cooling system 23 use and share the bypass pipe 11 as a common path. The bypass pipe 11 will be described with reference to FIG. 5. The arrows in FIG. 5 indicate the flow direction of the cooling water flowing in the bypass pipe 11. As shown in FIG. 5, the bypass pipe 11 branches into a path 11a, a path 11b, a path 11c, and a path 11d. The path 11d is branched at a branch point E of the bypass pipe 11, relative to the paths 11a to 11c, and merges at a junction point F. The paths 11a to 11c are as described in the first embodiment. The inverter cooling system 23 is provided on the path 11d. FIG. 5 is merely an example, and the engine cooling system 12, the HP system 14, the brake cooling system 16, and the inverter cooling system 23 may be suitably distributed to the paths 11a, 11b, 11c, and 11d respectively.

The fourth solenoid valve 25 is an electromagnetic valve capable of electrically controlling the throttle state. The operations of the first solenoid valve 18, the second solenoid valve 19, the third solenoid valve 20, and the fourth solenoid valve 25 are controlled by the heat management ECU 10a. In the present embodiment, the first solenoid valve 18, the second solenoid valve 19, the third solenoid valve 20, and the fourth solenoid valve 25 switch the open degree in a stepwise manner under the control of the heat management ECU 10a, so that the flow rate of cooling water can be controlled stepwise. The fourth solenoid valve 25 reduces the flow rate of the cooling water by reducing the open degree. The fourth solenoid valve 25 increases the flow rate of the cooling water by increasing the open degree.

The fourth solenoid valve 25 is provided between the branch point E of the path 11d and the inverter cooling system 23. Therefore, the flow rate of the cooling water flowing from the bypass pipe 11 into the inverter cooling system 23 can be reduced by decreasing the open degree of the fourth solenoid valve 25. On the other hand, the flow rate of the cooling water flowing into the inverter cooling system 23 from the bypass pipe 11 can be increased by opening the fourth solenoid valve 25. The fourth solenoid valve 25 also corresponds to a switching device. The first solenoid valve 18, the second solenoid valve 19, and the third solenoid valve 20 are the same as those described in the first embodiment except that they are controlled by the heat management ECU 10a instead of the heat management ECU 10.

The power switch 22 according to the second embodiment is a switch for starting the engine and/or the motor generator of a vehicle. The engine ECU 13, the air conditioner ECU 15, and the brake ECU 17 of the second embodiment are the same as those of the first embodiment except that the temperature related value and the current water temperature are output to the heat management ECU 10a instead of the heat management ECU 10.

The heat management ECU 10a is the same as the heat management ECU 10 of the first embodiment except that a part of the heat management related processing is different. The heat management ECU 10a corresponds to a vehicle heat management device. Further, a computer executes steps of the heat management related processing to execute the vehicle heat management method. The details of the heat management ECU 10a will be described below.

Schematic Configuration of Heat Management ECU 10a

Figure 6:
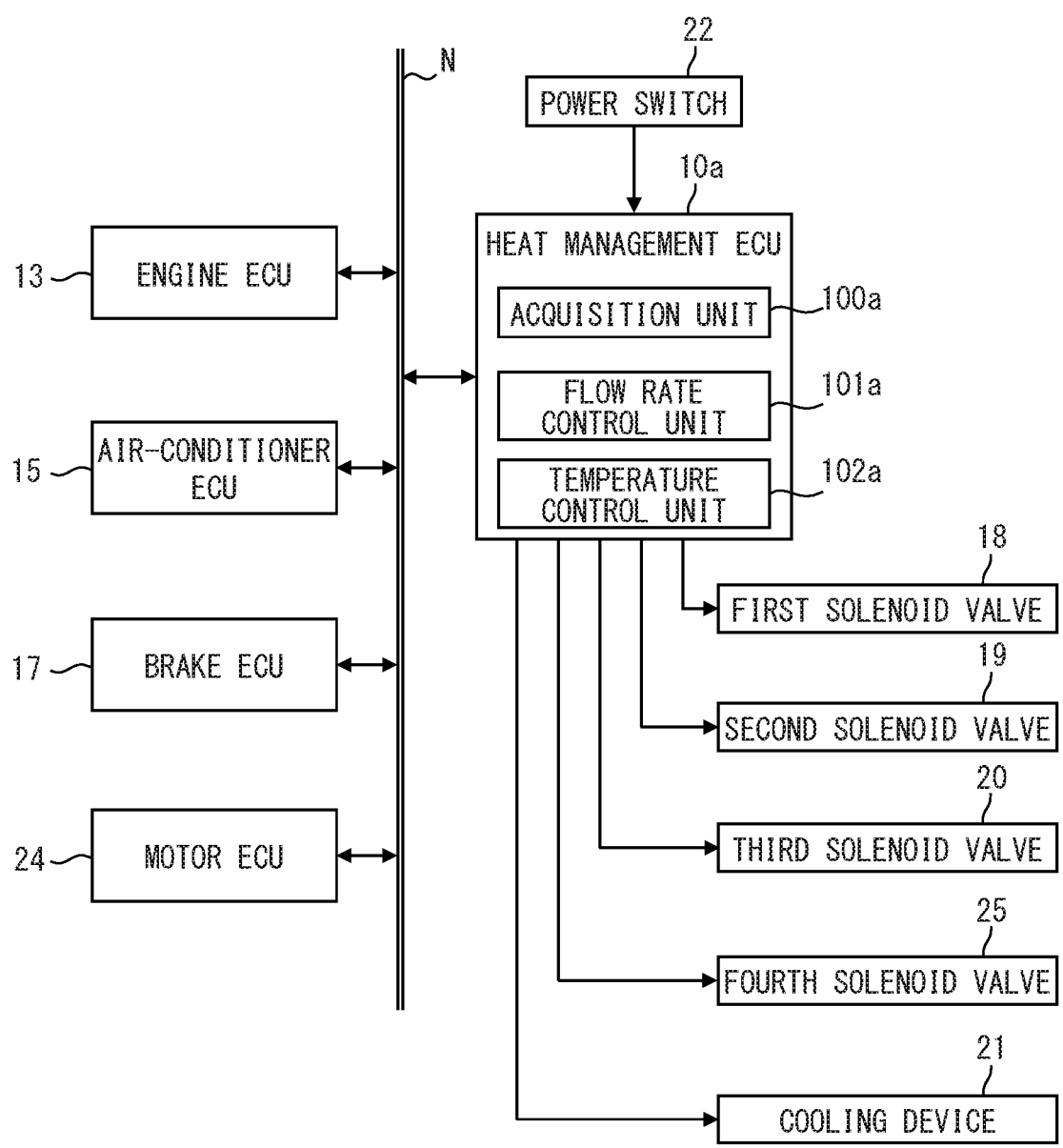
FIG. 6 is a diagram illustrating a schematic configuration of a heat management ECU of the second embodiment.

A schematic configuration of the heat management ECU 10a will be described with reference to FIG. 6. The heat management ECU 10a is connected to an engine ECU 13, an air conditioner ECU 15, a brake ECU 17, and a motor ECU 24 via an on-vehicle network N, for example, as shown in FIG. 6. The heat management ECU 10a is connected to the first solenoid valve 18, the second solenoid valve 19, the third solenoid valve 20, the cooling device 21, the power switch 22, and the fourth solenoid valve 25 via signal lines.

The heat management ECU 10a includes an acquisition unit 100a, a flow rate control unit 101a, and a temperature control unit 102a as functional blocks. A part or all of the functions executed by the heat management ECU 10a may be configured as hardware by one or plural ICs. Further, some or all of the functional blocks included in the heat management ECU 10a may be realized by a combination of execution of software by a processor and hardware members.

The acquisition unit 100a is the same as the acquisition unit 100 of the first embodiment except that the acquisition unit 100a acquires the inverter cooling value, the inverter-side upper limit value, and the water temperature of the inverter cooling system 23 output from the motor ECU 24 for each vehicle scene. In the second embodiment, when the engine cooling value, the heating value, the brake cooling value, and the inverter cooling value are not distinguished, they are referred to as temperature adjustment related values. When the engine-side upper limit, the air-conditioner-side upper limit, the brake-side upper limit, and the inverter-side upper limit are not distinguished, they are referred to as upper limits. The temperature adjustment related value and the upper limit are collectively called a temperature related value.

The flow rate control unit 101a switches the throttle state of the first solenoid valve 18, the second solenoid valve 19, the third solenoid valve 20, and the fourth solenoid valve 25. As an example, by default, the flow rate control unit 101a sets all of the first solenoid valve 18, the second solenoid valve 19, the third solenoid valve 20, and the fourth solenoid valve 25 to the fully opened state. Therefore, before the vehicle is started with the power switch 22, the flow rate of the cooling water flowing from the bypass pipe 11 to all of the engine cooling system 12, the HP system 14, the brake cooling system 16, and the inverter cooling system 23 is not restricted. When the engine cooling system 12, the HP system 14, the brake cooling system 16, and the inverter cooling system 23 are not distinguished, they are referred to as heat related systems.

The flow rate control unit 101a controls the first solenoid valve 18, the second solenoid valve 19, the third solenoid valve 20, and the fourth solenoid valve 25 based on the temperature related value acquired by the acquisition unit 100a for each vehicle scene. Details of the control by the flow rate control unit 101a for each vehicle scene will be described later. The temperature control unit 102a is the same as the temperature control unit 102 of the first embodiment except that a part of the processing is different. Details of the control by the temperature control unit 102a will also be described later.

Heat Management Related Processing in Heat Management ECU 10a

A flow of the heat management related processing in the heat management ECU 10a will be described. The heat management related processing at the time of starting the vehicle is the same as that described in the first embodiment except that the inverter cooling system 23 is added as a heat related system. The difference from the first embodiment is that the number of repetitions of the processing in S6 to S7 is increased by the number of heat related systems.

The heat management related processing, after the vehicle is started, in which a part of the heat related system needs to be cooled, is similar to that in the first embodiment except that the inverter cooling system 23 is added as the heat related system. The water temperature of the inverter cooling system 23 may exceed the upper limit value, for example, when a large load is continuously applied to the inverter.

In a hybrid vehicle, an engine and a motor are switched from each other for using as a traveling drive source. When the vehicle is driven by the motor after the vehicle is started, there is a possibility that the heat generated from the engine decreases and the water temperature of the heat related system does not reach the target temperature.

Figure 7:
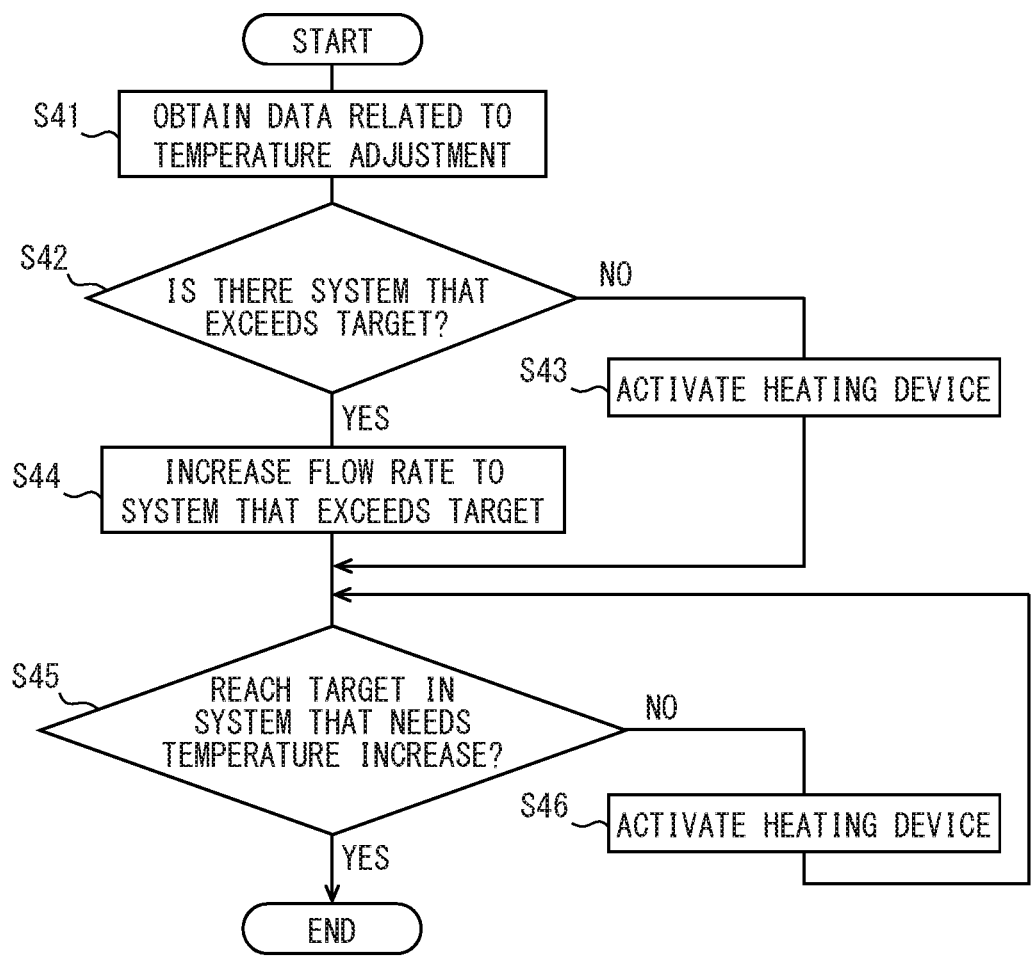
FIG. 7 is a flowchart illustrating a flow of a heat management related process, after a vehicle is started, in the heat management ECU of the second embodiment.

A flow of the heat management related processing when the temperature of the heat related system needs to be increased after the vehicle starts will be described with reference to the flowchart of FIG. 7. The flowchart of FIG. 7 may start when a temperature rise becomes necessary for a part of the heat related systems. The heat management ECU 10a may determine that the temperature of the heat related system needs to be increased when the water temperature that is sequentially acquired falls below the temperature adjustment related value acquired by the acquisition unit 100a. In FIG. 7, it is assumed that the water temperature of each heat related system is sequentially obtained by the acquisition unit 100a.

In step S41, the acquisition unit 100a acquires temperature adjustment related values, upper limit values, and water temperatures of the heat related systems output from the engine ECU 13, the air conditioner ECU 15, the brake ECU 17, and the motor ECU 24. The temperature adjustment related value and the upper limit value for each heat related system may be changed according to the status of the vehicle. When the temperature adjustment related value and the upper limit value of each heat related system are not changed according to the status of the vehicle, S41 may be omitted.

In step S42, it is determined whether or not there is a heat related system exceeding the target temperature based on the temperature adjustment related value acquired in S41 and the sequentially acquired water temperature (that is, the current water temperature). As an example, a heat related system in which a value obtained by subtracting the target temperature from the current water temperature is a positive value equal to or greater than a threshold value may be determined as a heat related system that exceeds the target temperature. The threshold value is suitably set to be larger than 0. In the case where S41 is omitted, in S42, processing may be performed using the temperature adjustment related value acquired by the acquisition unit 100a at the time of starting the vehicle.

In S42, when there is a heat related system exceeding the target temperature (YES in S42), the process proceeds to step S44. On the other hand, when there is no heat related system exceeding the target temperature (NO in S42), the process proceeds to step S43. For example, if the process of the flowchart in FIG. 7 is started when the water temperature of the engine cooling system 12 is lower than the target temperature, the temperature may be higher than the target temperature in the brake cooling system 16 and the inverter cooling system 23.

In step S43, the temperature control unit 102a operates the heating device in the engine cooling system 12, and proceeds to step S45. In S43, the temperature control unit 102a may heat the cooling water by operating the heat pump cycle of the HP system 14. The cooling water circulating in the bypass pipe 11 is heated by the processing in S43. In S43, the flow rate control unit 101 does not decrease the flow rate of the cooling water to the heat related system in which the water temperature is lower than the target temperature, so that the temperature of the heat related system can be raised by the heated cooling water. For example, when the water temperature is lower than the target temperature in the engine cooling system 12, the flow rate control unit 101a may open the third solenoid valve 20 fully. The flow rate may be kept reduced for a heat related system in which a temperature rise is not promoted.

In step S44, the flow rate control unit 101a increases the flow rate of the cooling water to the heat related system in which the water temperature is higher than the target temperature. For example, if the temperature of the engine cooling system 12 needs to be increased and the water temperatures of both the brake cooling system 16 and the inverter cooling system 23 exceed the target temperatures, it is preferable to increase the flow rate of the cooling water to both the brake cooling system 16 and the inverter cooling system 23. Specifically, the flow rate control unit 101a may open the third solenoid valve 20 and the fourth solenoid valve 25 fully, because it is possible to raise the temperature of the cooling water more quickly, as using more heat related systems for increasing the temperature.

If the temperature of the engine cooling system 12 needs to be raised and only the water temperature of the inverter cooling system 23 exceeds the target temperature, of the brake cooling system 16 and the inverter cooling system 23, the flow rate of the cooling water to the inverter cooling system 23 is increased. In this case, the flow rate of the cooling water to the brake cooling system 16 is not changed.

In step S45, the flow rate control unit 101a determines whether or not the water temperature of the heat related system that needs to be heated has reached the target temperature, based on the temperature adjustment related values acquired in S41 and the sequentially acquired water temperatures. When the target temperature has been reached (YES in S45), the heat management related processing ends. On the other hand, if the target temperature has not been reached (NO in S45), the process proceeds to step S46. In the case where S41 is omitted, in S45, processing may be performed using the temperature adjustment related value acquired by the acquisition unit 100a at the time of starting the vehicle.

In step S46, the same process as in S43 is performed, and the process returns to S45 to repeat the process. In other words, if the temperature rises to the target temperature due to the heat exchange between a heat related system where the water temperature is higher than the target temperature and a heat related system that needs to be heated, the heating performance of the heat related system is used. The heat management related processing ends without heating the cooling water. On the other hand, if the temperature cannot be raised to the target temperature by the cooling by the heat exchange, the temperature is raised to the target temperature by using the heating performance of the heat related system, and the heat management related processing ends.

According to the second embodiment, similarly to the first embodiment, it is possible to more effectively adjust the temperatures of the plural heat related systems mounted on the vehicle.

Third Embodiment

In the first embodiment, the vehicle is driven using an internal combustion engine as a traveling drive source. The present disclosure is not necessarily limited to this. For example, in a third embodiment, the present disclosure is applied to a vehicle in which an internal combustion engine is not used as a traveling drive source but uses a motor as a traveling drive source.

In the third embodiment, the inverter cooling system 23, the motor ECU 24, and the fourth solenoid valve 25 described in the second embodiment may be used in place of the engine cooling system 12, the engine ECU 13, and the first solenoid valve 18.

Fourth Embodiment

In the above-described embodiments, the heat management system 1, 1a includes the brake cooling system 16, the brake ECU 17, and the third solenoid valve 20, but is not necessarily limited to this. The heat management system 1, 1a may not include the brake cooling system 16, the brake ECU 17, and the third solenoid valve 20. Further, the heat related systems included in the heat management system 1, 1a are not limited to the above-described embodiments. For example, in case where a vehicle is driven using a motor as a traveling drive source, a cooling system for the motor and a cooling system for a traveling battery may be used as the heat related systems. In case of a fuel cell vehicle, a cooling system for cooling the fuel cell may be used as the heat related system. A certain temperature or more is required at the time of starting a vehicle driven by the fuel cell. Further, cooling of the fuel cell is required after the vehicle starts.

Fifth Embodiment

In the above-described embodiments, the flow rate of the cooling water flowing from the bypass pipe 11 to the heat related system is reduced while maintaining the flow, but is not necessarily limited to this. For example, the flow rate of the cooling water flowing from the bypass pipe 11 to the heat related system may be reduced by completely stopping the flow. In this case, the heat related system that stops the flow is reversibly removed from the bypass pipe 11 by switching the path for circulating the cooling water. A heat related system that can maintain the target temperature by the heating performance may be configured to be reversibly removed from the bypass pipe 11.

Note that the present disclosure is not limited to the embodiments described above and can variously be modified within the scope of claims. An embodiment obtained by appropriately combining the technical means disclosed in the different embodiments is also included in the technical scope of the present disclosure. Further, the control unit and the method thereof according to the present disclosure may be realized by a special-purpose computer that constitutes a processor programmed to execute one or more functions embodied by a computer program. Alternatively, the devices and techniques described in this disclosure may be implemented by dedicated hardware logic. Alternatively, the device and the technique described in the present disclosure may be implemented by one or more dedicated computers configured by a combination of a processor executing a computer program and one or more hardware logic circuits. The computer programs may be stored, as instructions to be executed by a computer, in a tangible non-transitory computer-readable medium.

What is claimed is:

1. A heat management device for a vehicle equipped with a plurality of heat related systems in which a temperature of an object is controlled by heat exchange with a fluid, the heat management device comprising:
    an acquisition unit configured to acquire a temperature related value from electronic control devices corresponding to the heat related systems, the temperature related value including a temperature adjustment related value related to a temperature change required in each of the heat related systems and/or an upper limit value related to a temperature allowed in each of the heat related systems; and
    a flow rate control unit configured to control a switching device that controls a flow rate of the fluid flowing through the heat related systems from a common path in which the fluid can circulate between the heat related systems, wherein
    the flow rate control unit controls the flow rate of the fluid flowing from the common path to the heat related systems by controlling the switching device in response to the temperature related value for a predetermined scene of the vehicle,
    the flow rate control unit controls the flow rate of the fluid flowing from the common path to the heat related systems by controlling the switching device in response to the temperature related value when temperatures of the heat related systems are to be raised at a time of starting the vehicle,
    the acquisition unit acquires the temperature related value including at least the temperature adjustment related value,
    at the time of starting the vehicle, the flow rate control unit causes the fluid to circulate without decreasing the flow rate of the fluid flowing to the heat related systems from the common path until the temperatures are raised to a temperature commonly required by the heat related systems, in response to the temperature adjustment related value, and
    the flow rate control unit reduces a flow rate of the fluid flowing through one of the heat related systems that no longer needs to be heated.

2. The heat management device according to claim 1, wherein
    the acquisition unit acquires the temperature related value including at least the upper limit value,
    the flow rate control unit controls the flow rate of the fluid flowing from the common path to the heat related systems by controlling the switching device in response to the temperature related value when a temperature of a part of the heat related systems is to be lowered after the vehicle is started, and
    the flow rate control unit is configured to increase a flow rate of the fluid flowing from the common path to one of the heat related systems having a temperature margin with respect to the upper limit value when a part of the heat related systems requires cooling after the vehicle is started.

3. The heat management device according to claim 2, wherein
    the flow rate control unit is configured to increase a flow rate of the fluid flowing from the common path to all of the heat related systems having the temperature margin with respect to the upper limit value, when a part of the heat related systems requires cooling after the vehicle is started.

4. The heat management device according to claim 1, wherein
    the flow rate control unit controls the flow rate of the fluid flowing from the common path to the heat related systems by controlling the switching device in response to the temperature related value when a temperature of a part of the heat related systems is to be raised after the vehicle is started,
    the acquisition unit acquires the temperature related value including at least the temperature adjustment related value, and
    the flow rate control unit is configured to increase the flow rate of the fluid flowing from the common path to a heat related system requiring a temperature increase in response to the temperature adjustment related value when the heat related system requires the temperature increase after the vehicle is started.

5. A heat management system for a vehicle comprising:
    a plurality of heat related systems in which a temperature of an object is controlled by heat exchange with a fluid;
    a plurality of electronic control devices corresponding to the heat related systems and outputting a temperature related value including a temperature adjustment related value related to a temperature change required in each of the heat related systems and/or an upper limit value related to a temperature allowed in each of the heat related systems;
    a common path capable of circulating the fluid between the heat related systems;
    a switching device configured to control a flow rate of the fluid flowing to the heat related systems from the common path; and
    a vehicle heat management device having
        an acquisition unit configured to acquire the temperature related values of the heat related systems from the electronic control devices corresponding to the heat related systems, and
        a flow rate control unit configured to control the switching device to control the flow rate of the fluid flowing from the common path to the heat related systems in response to the temperature related values for a predetermined scene of the vehicle,
    the flow rate control unit controls the flow rate of the fluid flowing from the common path to the heat related systems by controlling the switching device in response to the temperature related value when temperatures of the heat related systems are to be raised at a time of starting the vehicle,
    the acquisition unit acquires the temperature related value including at least the temperature adjustment related value,
    at the time of starting the vehicle, the flow rate control unit causes the fluid to circulate without decreasing the flow rate of the fluid flowing to the heat related systems from the common path until the temperatures are raised to a temperature commonly required by the heat related systems, in response to the temperature adjustment related value, and
    the flow rate control unit reduces a flow rate of the fluid flowing through one of the heat related systems that no longer needs to be heated.

6. The heat management system according to claim 5, wherein the acquisition unit acquires the temperature related value including at least the upper limit value, the flow rate control unit controls the flow rate of the fluid flowing from the common path to the heat related systems by controlling the switching device in response to the temperature related value when a temperature of a part of the heat related systems is to be lowered after the vehicle is started, and the flow rate control unit is configured to increase a flow rate of the fluid flowing from the common path to one of the heat related systems having a temperature margin with respect to the upper limit value when a part of the heat related systems requires cooling after the vehicle is started.

7. The heat management system according to claim 6, wherein the flow rate control unit is configured to increase a flow rate of the fluid flowing from the common path to all of the heat related systems having the temperature margin with respect to the upper limit value, when a part of the heat related systems requires cooling after the vehicle is started.

8. The heat management system according to claim 5, wherein the flow rate control unit controls the flow rate of the fluid flowing from the common path to the heat related systems by controlling the switching device in response to the temperature related value when a temperature of a part of the heat related systems is to be raised after the vehicle is started, the acquisition unit acquires the temperature related value including at least the temperature adjustment related value, and the flow rate control unit is configured to increase the flow rate of the fluid flowing from the common path to a heat related system requiring a temperature increase in response to the temperature adjustment related value when the heat related system requires the temperature increase after the vehicle is started.

9. A computer-implemented heat management method for a vehicle equipped with a plurality of heat related systems in which a temperature of an object is controlled by heat exchange with a fluid, the method comprising:

acquiring a temperature related value from electronic control units corresponding to the heat related systems, the temperature related value including a temperature adjustment related value related to a temperature change required in each of the heat related systems and/or an upper limit value related to a temperature allowed in each of the heat related systems;

controlling a flow rate of the fluid flowing to the heat related systems from a common path in which the fluid circulates between the heat related systems by controlling a switching device in response to the temperature related value for a predetermined scene of the vehicle;

controlling the flow rate of the fluid flowing from the common path to the heat related systems by controlling the switching device in response to the temperature related value when temperatures of the heat related systems are to be raised at a time of starting the vehicle;

acquiring the temperature related value including at least the temperature adjustment related value;

at the time of starting the vehicle, causing the fluid to circulate without decreasing the flow rate of the fluid flowing to the heat related systems from the common path until the temperatures are raised to a temperature commonly required by the heat related systems, in response to the temperature adjustment related value; and reducing a flow rate of the fluid flowing through one of the heat related systems that no longer needs to be heated.

10. The computer-implemented heat management method according to claim 9, further comprising acquiring the temperature related value including at least the upper limit value, controlling the flow rate of the fluid flowing from the common path to the heat related systems by controlling the switching device in response to the temperature related value when a temperature of a part of the heat related systems is to be lowered after the vehicle is started, and increasing a flow rate of the fluid flowing from the common path to one of the heat related systems having a temperature margin with respect to the upper limit value when a part of the heat related systems requires cooling after the vehicle is started.

11. The computer-implemented heat management method according to claim 10, further comprising increasing a flow rate of the fluid flowing from the common path to all of the heat related systems having the temperature margin with respect to the upper limit value, when a part of the heat related systems requires cooling after the vehicle is started.

12. The computer-implemented heat management method according to claim 9, further comprising controlling the flow rate of the fluid flowing from the common path to the heat related systems by controlling the switching device in response to the temperature related value when a temperature of a part of the heat related systems is to be raised after the vehicle is started, acquiring the temperature related value including at least the temperature adjustment related value, and increasing the flow rate of the fluid flowing from the common path to a heat related system requiring a temperature increase in response to the temperature adjustment related value when the heat related system requires the temperature increase after the vehicle is started.

13. A program product for a vehicle equipped with a plurality of heat related systems in which a temperature of an object is controlled by heat exchange with a fluid, the program product stored on a non-transitory computer readable medium and comprising instructions for causing a computer to execute:

acquiring a temperature related value from electronic control units corresponding to the heat related systems, the temperature related value including a temperature adjustment related value related to a temperature change required in each of the heat related systems and/or an upper limit value related to a temperature allowed in each of the heat related systems;

controlling a flow rate of the fluid flowing to the heat related systems from a common path in which the fluid circulates between the heat related systems by controlling a switching device in response to the temperature related values for a predetermined scene of the vehicle;

controlling the flow rate of the fluid flowing from the common path to the heat related systems by controlling the switching device in response to the temperature related value when temperatures of the heat related systems are to be raised at a time of starting the vehicle;

acquiring the temperature related value including at least the temperature adjustment related value;

at the time of starting the vehicle, causing the fluid to circulate without decreasing the flow rate of the fluid flowing to the heat related systems from the common path until the temperatures are raised to a temperature commonly required by the heat related systems, in response to the temperature adjustment related value; and reducing a flow rate of the fluid flowing through one of the heat related systems that no longer needs to be heated.

14. The program product according to claim 13, further comprising instructions for causing the computer to execute:

acquiring the temperature related value including at least the upper limit value, controlling the flow rate of the fluid flowing from the common path to the heat related systems by controlling the switching device in response to the temperature related value when a temperature of a part of the heat related systems is to be lowered after the vehicle is started, and increasing a flow rate of the fluid flowing from the common path to one of the heat related systems having a temperature margin with respect to the upper limit value when a part of the heat related systems requires cooling after the vehicle is started.

15. The program product according to according to claim 14, further comprising instructions for causing the computer to execute:

increasing a flow rate of the fluid flowing from the common path to all of the heat related systems having the temperature margin with respect to the upper limit value, when a part of the heat related systems requires cooling after the vehicle is started.

16. The program product according to claim 13, further comprising instructions for causing the computer to execute:

controlling the flow rate of the fluid flowing from the common path to the heat related systems by controlling the switching device in response to the temperature related value when a temperature of a part of the heat related systems is to be raised after the vehicle is started, acquiring the temperature related value including at least the temperature adjustment related value, and increasing the flow rate of the fluid flowing from the common path to a heat related system requiring a temperature increase in response to the temperature adjustment related value when the heat related system requires the temperature increase after the vehicle is started.

\* \* \* \* \*